(12) United States Patent
Fuller et al.

(10) Patent No.: US 7,989,512 B1
(45) Date of Patent: Aug. 2, 2011

(54) POLYELECTROLYTE MEMBRANES DERIVED FROM SOLUBLE PERFLUOROCYCLOBUTANE POLYMERS WITH SULFONYL CHLORIDE GROUPS

(75) Inventors: Timothy J. Fuller, Pittsford, NY (US); Sean M MacKinnon, Fairport, NY (US); Michael R. Schoeneweiss, W. Henrietta, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/726,061

(22) Filed: Mar. 17, 2010

(51) Int. Cl.
  *C08F 214/14* (2006.01)
  *C08J 5/22* (2006.01)
(52) U.S. Cl. .......... 521/27; 526/250; 526/252; 526/253; 526/254; 525/326.2
(58) Field of Classification Search ............... 525/326.2; 526/250, 252, 253, 254; 521/27
  See application file for complete search history.

(56) References Cited

U.S. PATENT DOCUMENTS

| | | | |
|---|---|---|---|
| 5,006,408 A * | 4/1991 | Green et al. ................. | 428/395 |
| 5,021,602 A | 6/1991 | Clement et al. | |
| 5,037,917 A | 8/1991 | Babb et al. | |
| 5,066,746 A | 11/1991 | Clement et al. | |
| 5,159,037 A | 10/1992 | Clement et al. | |
| 5,159,038 A | 10/1992 | Babb et al. | |
| 5,910,378 A | 6/1999 | Debe et al. | |
| 6,124,060 A | 9/2000 | Akita et al. | |
| 6,183,668 B1 | 2/2001 | Debe et al. | |
| 6,277,512 B1 | 8/2001 | Hamrock et al. | |
| 6,444,343 B1 | 9/2002 | Prakash et al. | |
| 6,523,699 B1 | 2/2003 | Akita et al. | |
| 6,559,237 B1 | 5/2003 | Mao et al. | |
| 6,847,518 B2 | 1/2005 | Fukuda et al. | |
| 6,875,537 B2 | 4/2005 | Tani et al. | |
| 6,926,984 B2 | 8/2005 | Asano et al. | |
| 6,933,068 B2 | 8/2005 | Asano et al. | |
| 6,953,653 B2 | 10/2005 | Smith et al. | |
| 6,986,962 B2 | 1/2006 | Oyanagi et al. | |
| 7,001,929 B2 | 2/2006 | Goto et al. | |
| 7,045,241 B2 | 5/2006 | Akita et al. | |
| 2001/0018144 A1 | 8/2001 | Watakabe et al. | |
| 2002/0014405 A1 | 2/2002 | Arcella et al. | |
| 2003/0017379 A1 | 1/2003 | Menashi | |
| 2004/0214058 A1 | 10/2004 | Tada et al. | |
| 2004/0214065 A1 | 10/2004 | Kanaoka et al. | |
| 2005/0014927 A1 | 1/2005 | Akita | |
| 2005/0043487 A1 | 2/2005 | Felix et al. | |
| 2005/0048342 A1 | 3/2005 | Wakahoi et al. | |
| 2005/0053810 A1 | 3/2005 | Kato et al. | |
| 2005/0058864 A1 | 3/2005 | Goebel | |
| 2005/0064260 A1 | 3/2005 | Otsuki et al. | |
| 2005/0100770 A1 | 5/2005 | Sugawara et al. | |
| 2005/0106440 A1 | 5/2005 | Komiya | |
| 2005/0116206 A1 | 6/2005 | Kakuta et al. | |
| 2005/0130024 A1 | 6/2005 | Otsuki et al. | |
| 2005/0142397 A1 | 6/2005 | Wakahoi et al. | |
| 2005/0143530 A1 | 6/2005 | Iwadate et al. | |
| 2005/0175886 A1 | 8/2005 | Fukuda et al. | |
| 2005/0197467 A1 | 9/2005 | Komiya et al. | |
| 2005/0227138 A1 | 10/2005 | Fukuda et al. | |
| 2005/0233181 A1 | 10/2005 | Wariishi et al. | |
| 2005/0260474 A1 | 11/2005 | Asano et al. | |
| 2006/0019147 A1 | 1/2006 | Fukuda et al. | |
| 2006/0127728 A1 | 6/2006 | Otsuki et al. | |
| 2006/0177719 A1 | 8/2006 | Fuller et al. | |
| 2007/0042242 A1 | 2/2007 | Tada et al. | |
| 2007/0099054 A1 | 5/2007 | Fuller et al. | |
| 2007/0141237 A1 | 6/2007 | Okiyama et al. | |
| 2008/0027152 A1 * | 1/2008 | Maier et al. ..................... | 521/25 |
| 2009/0278083 A1 | 11/2009 | Fuller et al. | |
| 2009/0278091 A1 | 11/2009 | MacKinnon et al. | |
| 2009/0281245 A1 | 11/2009 | MacKinnon et al. | |
| 2009/0281262 A1 | 11/2009 | MacKinnon et al. | |
| 2009/0281270 A1 | 11/2009 | Fuller et al. | |

FOREIGN PATENT DOCUMENTS

| | | |
|---|---|---|
| JP | 2003535929 T | 12/2003 |
| JP | 2005129298 A | 5/2005 |
| JP | 2005166557 A | 6/2005 |
| JP | 2005179380 A | 7/2005 |
| JP | 2009 249 487 A | 10/2009 |
| WO | 2004/051776 | 6/2004 |
| WO | 2007/052954 A1 | 5/2007 |

OTHER PUBLICATIONS

Smith, D.W. et al., "Perfluorocyclobutane Aromatic Polyethers. Synthesis and Characterization of New Siloxane-Containing Fluoropolymers," Macromolecules 1996, v. 29, pp. 852-860.

Smith, D.W. et al., "Perfluorocyclobutane (PFCB) polyaryl ethers: versatile coatings material," J. of Fluorine Chem., v. 104, pp. 109-117 (2000).

Souzy, R. et al., "Functional fluoropolymers for fuel cell membranes," Solid State Ionics, v. 176, pp. 2839-2848 (2005).

Souzy, R. et al., "Functional fluoropolymers for fuel cell membranes," Prog. Polm. Sci. 30, 2005, pp. 644-687.

Ford, L.A. et al., "New Aromatic Perfluorovinyl Ether Monomers Containing the Sulfonimide Acid Functionality," Polymeric Materials Science & Eng., v. 83, 2000, pp. 10-11 (American Chemical Society).

Souzy, R. et al., "Synthesis and (co)polymerization of monofluoro, difluoro, trifluorostyrene and ((trifluorovinyl)oxy) benzene," Prog. Polm. Sci. 29 (2004), pp. 75-106.

* cited by examiner

*Primary Examiner* — Bernard Lipman
(74) *Attorney, Agent, or Firm* — Brooks Kushman P.C.

(57) ABSTRACT

A method of forming an ionomeric membrane includes a step of reacting a first polymer in chlorosulfonic acid to form a first precipitate. The first precipitate comprising a polymer including a polymer unit having at least one —$SO_2Cl$ moiety attached thereto and includes a step of dissolving the first precipitate in a polar aprotic solvent to form the first solution. A polymeric membrane is then formed from the first solution such that the membrane includes the polymer unit having at least one —$SO_2Cl$. The polymer including a polymer unit a polymer unit having at least one —$SO_2Cl$ is then reacted with a nucleophilic compound to form the polymeric membrane.

20 Claims, 2 Drawing Sheets

POLYELECTROLYTE MEMBRANES DERIVED FROM SOLUBLE PERFLUOROCYCLOBUTANE POLYMERS WITH SULFONYL CHLORIDE GROUPS

BACKGROUND OF THE INVENTION

1. Field of the Invention

The present invention relates to ion conductive polymers, fuel cell membranes and membrane electrode assemblies.

2. Background Art

Proton conductive polymer membranes are an important component in a fuel cell device. To achieve optimal fuel cell performance, the proton conductive polymer membrane must maintain a high ionic conductivity and mechanical stability at high and low relative humidity. Aromatic perfluorocyclobutane random copolymers have been disclosed in U.S. Pat. No. 6,559,237 as improved membrane materials for fuel cells. Due to the chain configuration of random copolymers, however, water swelling at high humidity and membrane shrinking at low humidity are common problems with random copolymers. A random copolymer membrane lacks the mechanical robustness to withstand the rigors of hydration and dehydration within an operating fuel cell.

Accordingly, there is a need to provide a further improved proton conductive polymer membrane that maintains robust mechanical properties and high ionic conductivity at a wide range of humidity conditions.

SUMMARY OF THE INVENTION

The present invention solves one or more problems of the prior art by providing in at least one embodiment a method of forming an ionomeric membrane. The ionomeric membrane comprises a polymer unit having formula 1:

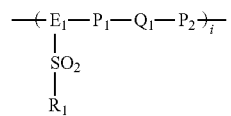

wherein:

$P_1$, $P_2$, are each independently absent, —O—, —S—, —SO—, —SO$_2$—, —CO—, —NH—, —NR$_2$—, or —R$_3$—;

$R_1$ is —OR$_5$, —NR$_S$, —X, —NHR$_5Z_2$, or —OR$_5Z_2$, —NHSO$_2$CF$_3$;

$R_2$ is $C_{1-25}$ alkyl or $C_{1-25}$ aryl;

$R_3$ is $C_{1-25}$ alkylene, $C_{1-25}$ perfluoroalkylene, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$R_5$ is $C_{1-25}$ alkyl or $C_{1-25}$ aryl;

$E_1$ is an aromatic-containing moiety;

$Z_2$ is —SO$_3$H, —PO$_3$H, —OH, or —NH$_2$;

X is an —OH, a halogen, an ester,

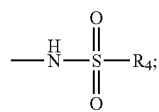

i is an integer from 1 to 10,000; and $Q_1$ is a fluorinated cyclobutyl moiety, the method comprising:

a) reacting a polymer comprising a polymer unit having formula 3 in chlorosulfonic acid to form a first precipitate, the first precipitate comprising a polymer comprising a polymer unit having formula 4 and dissolves in a polar aprotic solvent to form a first solution:

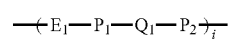

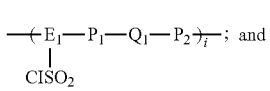

b) forming a polymeric membrane from the first solution, the polymeric membrane including the polymer comprising a polymer unit having formula 4; and c) reacting the polymer comprising a polymer unit having formula 4 with a nucleophilic compound to form the base polymer having polymer unit 1.

It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF THE PREFERRED EMBODIMENT(S)

Figure 1:
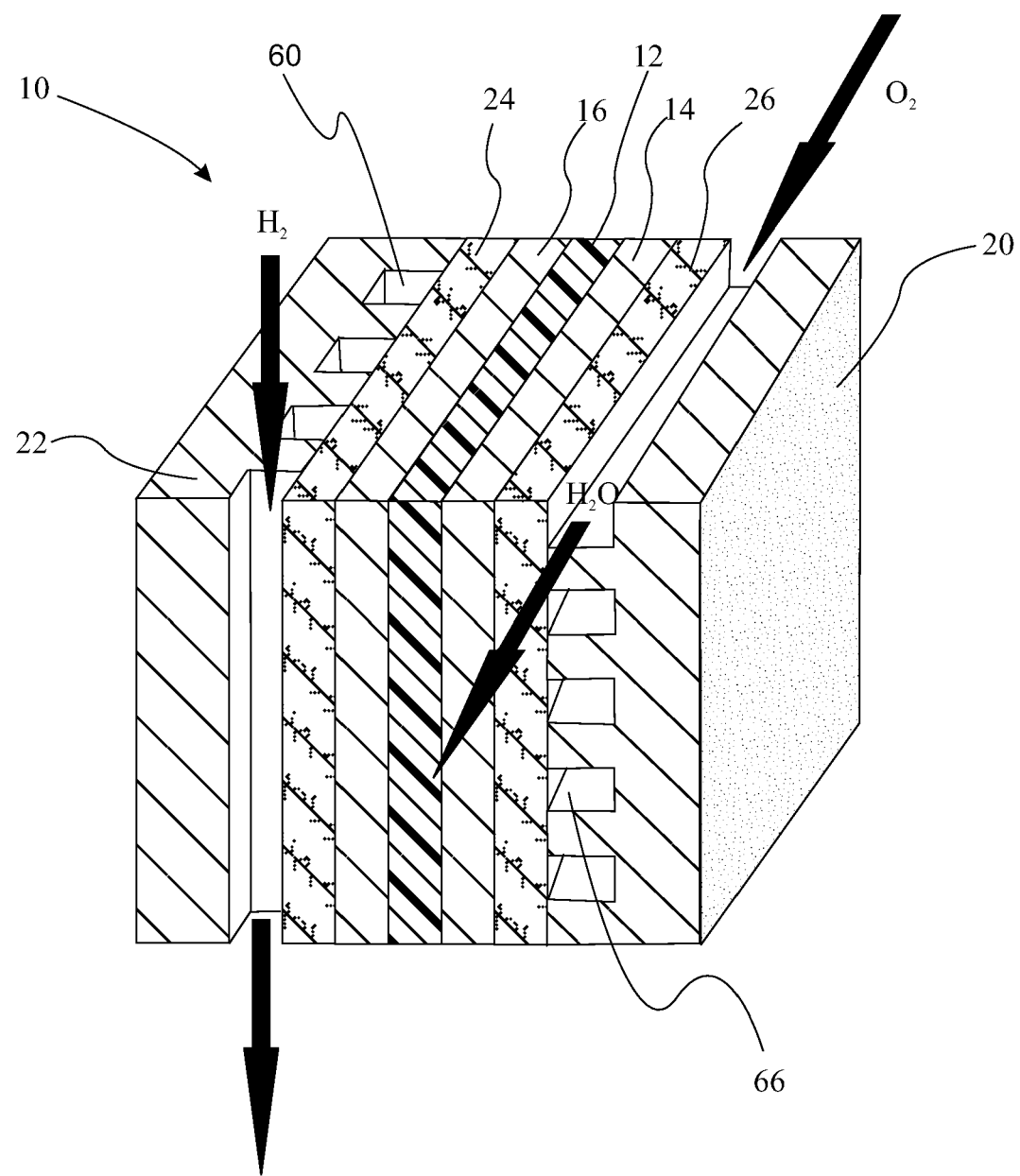
FIG. 1 provides a schematic illustration of a fuel cell incorporating the polymers of an embodiment of the present invention.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," "block", "random," "segmented block," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

The following description of the embodiment(s) is merely exemplary in nature and is in no way intended to limit the invention, its application, or uses.

The term "block" as used herein means a portion of a macromolecule, comprising many constitutional units, that has at least one feature that is not present in adjacent portions.

The term "block macromolecule" as used herein means a macromolecule that is composed of blocks in linear sequence.

The term "block polymer" as used herein means a substance composed of block macromolecules.

The term "block copolymer" as used herein means a polymer in which adjacent blocks are constitutionally different, i.e., each of these blocks comprises constitutional units derived from different characteristic species of monomer or with different composition or sequence distribution of constitutional units.

The term "random copolymer" as used herein means a copolymer consisting of macromolecules in which the probability of finding a given repeating unit at any given site in the chain is independent of the nature of the adjacent units.

With reference to FIG. 1, a fuel cell that incorporates a polymer electrolyte including polymers from the invention is provided. PEM fuel cell 10 includes polymeric ion conductive membrane 12 disposed between cathode catalyst layer 14 and anode catalyst layer 16. Polymeric ion conductive composite membrane 12 includes one or more of the polymers set forth below. Fuel cell 10 also includes conductive plates 20, 22, gas channels 60 and 66, and gas diffusion layers 24 and 26. Advantageously, the present invention provides embodiments for composite membrane 12.

In an embodiment of the present invention, a method of forming an ionomeric membrane is provided. The ionomeric membrane comprises a polymer unit having formula 1:

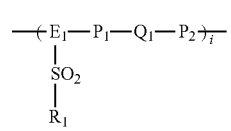

wherein:

$P_1$, $P_2$, are each independently absent, —O—, —S—, —SO—, —SO$_2$—, —CO—, —NH—, —NR$_2$—, or —R$_3$—;

$R_1$ is —OR$_5$, —NR$_5$, —X, —NHR$_5$Z$_2$, or —OR$_5$Z$_2$, —NHSO$_2$CF$_3$;

$R_2$ is $C_{1-25}$ alkyl or $C_{1-25}$ aryl;

$R_3$ is $C_{1-25}$ alkylene, $C_{1-25}$ perfluoroalkylene, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$R_5$ is $C_{1-25}$ alkyl or $C_{1-25}$ aryl;

i is an integer;

$E_1$ is an aromatic-containing moiety;

$Z_2$ is —SO$_3$H, —PO$_3$H, —OH, or —NH$_2$;

X is an —OH, a halogen, an ester,

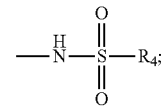

i is an integer from 1 to 10,000; and $Q_1$ is a fluorinated cyclobutyl moiety.

Figure 2:
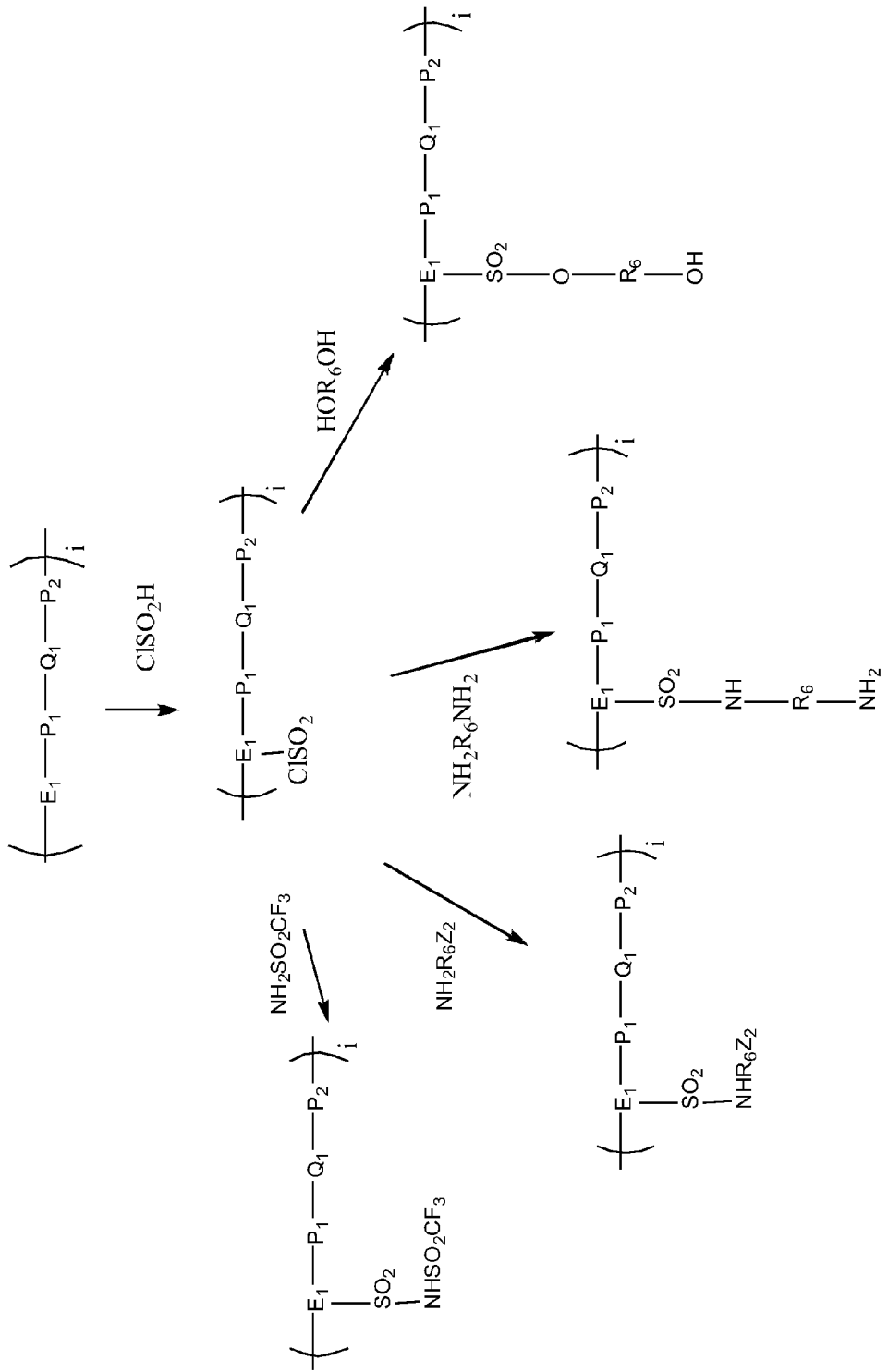
FIG. 2 is a reaction scheme describing the synthesis of examples of preferred embodiments of the invention.

With reference to FIG. 2, reaction scheme for forming the polymer unit having formula 1 are provided. In step a) of the method, a polymer comprising a polymer unit having formula 3 is dissolved in dichloromethane and reacted with chlorosulfonic acid and the corresponding arylsulfonyl chloride is dissolved in a polar aprotic solvent, such as N,N'-dimethylacetamide to form a first solution. The first solution includes a polymer comprising a polymer unit having formula 4 which is at least partially dissolved in chlorosulfonic acid:

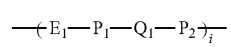

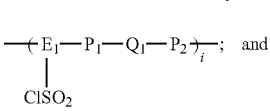

In step b), a polymeric membrane is formed from the first solution. The polymeric membrane includes the polymer comprising a polymer unit having formula 4 which is now in the form of a membrane. In step c), the polymer comprising a polymer unit having formula 4 is reacted with a nucleophilic compound to form a base polymer having polymer unit 1.

Continuing to refer to FIG. 2, any number of nucleophic compounds are used in step c). Examples of such nucleophilic compounds include, but are not limited to, HOR$_5$, HNR$_5$, HX is HNHR$_5$Z$_2$, and HOR$_5$Z$_2$.

In a variation of the present embodiment, the ionomeric polymer further includes a polymer unit having formula 2:

$$-\!\!+\!\!E_2-P_3-Q_2-P_4\!\!+_{\!j}-$$

$E_2$ is an aromatic-containing moiety;
$P_3$, $P_4$, are each independently absent, —O—, —S—, —SO—, —SO$_2$—, —CO—, —NH—, —NR$_2$—, or —R$_3$—;
$R_2$ is $C_{1-25}$ alkyl or $C_{1-25}$ aryl;
$R_3$ is $C_{1-25}$ alkylene, $C_{1-25}$ perfluoroalkylene, or $C_{1-25}$ arylene;
j is an integer from 1 to 10,000; and
$Q_2$ is a fluorinated cyclobutyl moiety.

In a variation of the present embodiment, $E_1$ and $E_2$ each independently include one or more of the following moieties:

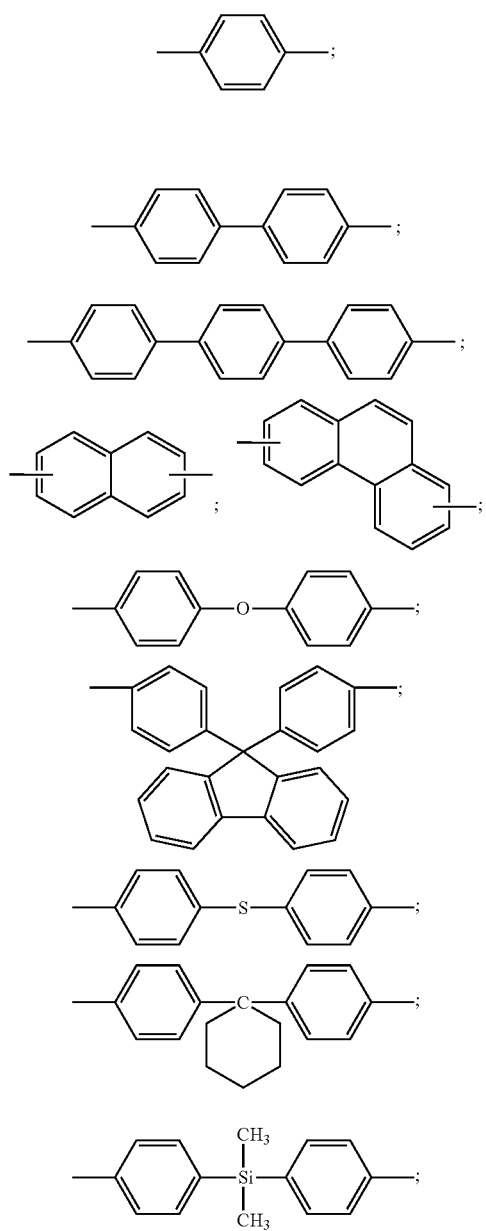

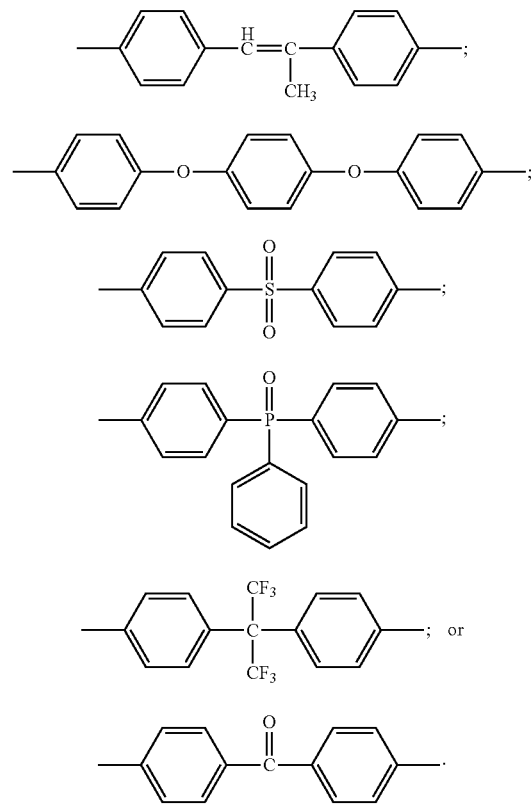

Examples for $Q_1$ and $Q_2$ in the above formulae are:

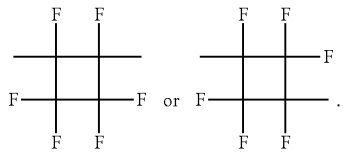

The following examples illustrate the various embodiments of the present invention. Those skilled in the art will recognize many variations that are within the spirit of the present invention and scope of the claims.

Synthesis of PFCB Polymer with Sulfonyl Chloride Groups. Structure 2. In a 100-mL screw-cap jar with a magnetic stirrer, 2.5 g (42 mmol BPVE) of perfluorocyclobutane polymer TRJ-3058 [structure 5 consisting of a 2:1 ratio of BPVE oligomer (Mn=8K) copolymerized with 6F monomer, Mn=50K, Tetramer Technologies, Pendleton, S.C.] is dissolved in dichloromethane (50.0 g, >99.9%, Aldrich, cat# 439233). Chlorosulfonic acid (6.25 g, 2.5 wt eq., 12.8 mol. eq.) is added and the reaction mixture is stirred mechanically while maintaining an internal reaction temperature of 36° C. After 15-20 minutes a purple chlorosulfonated-PFCB polymer precipitates out of solution and then after 1 hour, the supernatant dichloromethane is decanted off. The collected precipitate is blended and washed thoroughly with methylene chloride and then filtered. The collected polymer with sulfonyl chloride groups (and having the structure 6) is then dried under vacuum at 25° C. for 16 hrs. This polymer dissolves in N,N-dimethylacetamide.

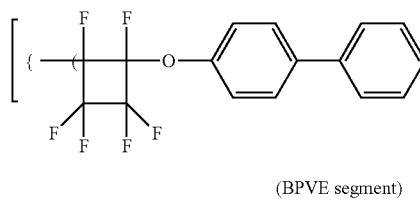
(BPVE segment)

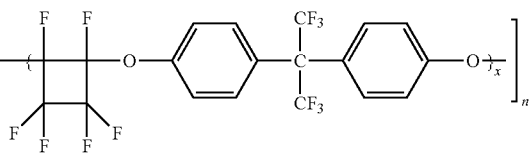
(6F segment)

5

$CH_2Cl_2 | ClSO_3H$

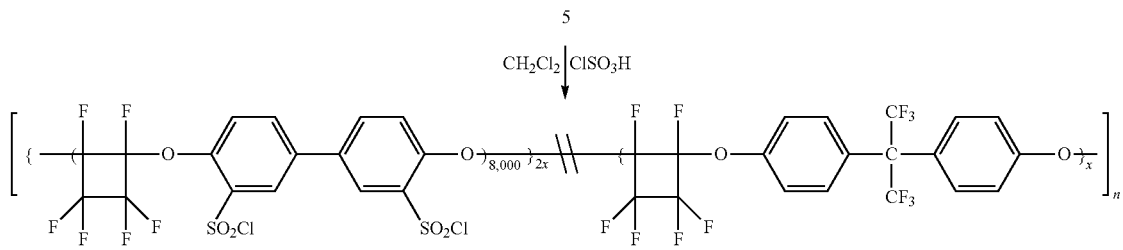

6

Nucleophilic Substitution of Structure 5 Sulfonyl Chloride Groups to Form Polymer 3.

To a 250-mL round-bottom flask is added CF3SO2NNaSi(CH3)3 [3.71 g, 15.3 mmol, made as described in Thomas, B. H., G. Shafer, J. J. Ma, M.-H. Tu, D. D. DesMarteau, J. Fluorine Chem., 125 (2004)1231-1240], N,N-dimethylacetamide (DMAc) (100 mL) and polymer 6 (3.8 grams, 7.6 mmol SO2Cl). The reaction mixture is stirred at 80° C. under nitrogen for 2 days. The resultant solution is added to 2 M sulfuric acid (1 L) to precipitate a polymer that is filtered and vacuum dried. The polymer is then coated from a 10 wt. % solids solution in DMAc onto windowpane glass, and the wet film is then heated at 80° C. until dry. The film is floated off of the glass by immersion in water and then is air dried.

Preparation of Blend Solution

An ionomer/elastomer blended solution is prepared by mixing 7 g of a 10 wt % N,N-dimethylacetamide solution of polymer 7 with 3 g of a 10 wt % solution of KF-2751 in N,N-dimethylacetamide and homogenizing at 20,000 RPM twice for 3 minute intervals to yield clear yellow solutions. The solution is filtered through a 5 micron Mitex™ membrane PTFE filters using high pressure directly into centrifuge tubes. The tubes are capped and spun for 10 minutes at 3,000 rpm to remove air bubbles.

Membrane Coating

A sheet of window pane glass is placed on the vacuum table on an Erichson casting table with platen set at 80° C. The surface is wiped clean with iso-propanol and the ionomer solution is coated at a blade gap of 10 mil at a draw speed of

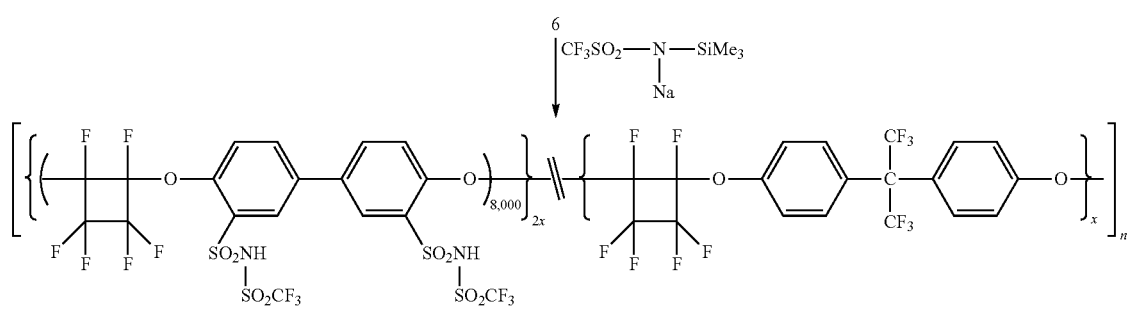

7

A 10 wt % solution is prepared by dissolving 1.0 g of the sulfonamide polymer in 9.0 grams of N,N-dimethylacetamide (>99.9%, Aldrich, cat# 270555) at 50° C. over a period of 2 hours. The solution is homogenized at 15,000 rpm for a few minutes.

Preparation of KF-2751 Elastomer Solution

A 10 wt % solution of Kynar® vinylidene fluoride resin, grade 2751-00 (Arkema, Lot#03C8106) is prepared by dissolving 20 g of the elastomer powder in 180 grams of N,N-dimethylacetamide (>99.9%, Aldrich, cat# 270555) by rolling in a jar at room temperature overnight.

12.5 mm/s at 50° C. Drying is continued at 80° C. for 20 minutes and the membranes are cut away in 10 cm×10 cm sections for characterization.

A sheet of window pane glass is placed on the vacuum table on an Erichson casting table with platen set at 80° C. The surface is wiped clean with iso-propanol and the ionomer solution is coated at a blade gap of 10 mil at a draw speed of 12.5 mm/s at 50° C. Drying is continued at 80° C. for 20 minutes and the membranes are cut away in 10 cm×10 cm sections for characterization.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of forming an ionomeric membrane comprising a polymer unit having formula 1:

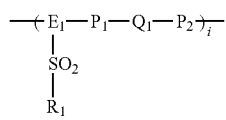

wherein:
P$_1$, P$_2$, are each independently absent, —O—, —S—, —SO—, —SO$_2$—, —CO—, —NH—, —NR$_2$—, or —R$_3$—;
R$_1$ is —OR$_5$, —NR$_S$, —X, —NHR$_5$Z$_2$, —OR$_5$Z$_2$, or —NHSO$_2$CF$_3$;
R$_2$ is C$_{1-25}$ alkyl or C$_{1-25}$ aryl;
R$_3$ is C$_{1-25}$ alkylene, C$_{1-25}$ perfluoroalkylene, or C$_{1-25}$ arylene;
R$_4$ is trifluoromethyl, C$_{1-25}$ alkyl, C$_{1-25}$ perfluoroalkylene, C$_{1-25}$ aryl, or another E$_1$ group;
R$_5$ is C$_{1-25}$ alkyl or C$_{1-25}$ aryl;
E$_1$ is an aromatic-containing moiety;
Z$_2$ is —SO$_3$H, —PO$_3$H, —OH, or —NH$_2$;
X is an —OH, a halogen, an ester, or

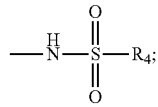

i is an integer from 1 to 10,000; and
Q$_1$ is a fluorinated cyclobutyl moiety, the method comprising:
a) reacting a polymer comprising a polymer unit having formula 3 in chlorosulfonic acid to form a first precipitate, the first precipitate comprising a polymer comprising a polymer unit having formula 4 and dissolves in a polar aprotic solvent to form a first solution:

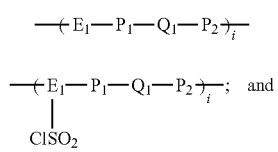

b) forming a polymeric membrane from the first solution, the polymeric membrane including the polymer comprising a polymer unit having formula 4; and
c) reacting the polymer comprising a polymer unit having formula 4 with a nucleophilic compound to form a base polymer having polymer unit 1.

2. The method of claim 1 wherein the nucleophilic compound is HOR$_5$.

3. The method of claim 1 wherein the nucleophilic compound is HNR$_5$.

4. The method of claim 1 wherein the nucleophilic compound is HX.

5. The method of claim 1 wherein the nucleophilic compound is HNHR$_5$Z$_2$.

6. The method of claim 1 wherein the nucleophilic compound is HOR$_5$Z$_2$.

7. The method of claim 1 wherein the base polymer further includes a polymer unit having formula 2:

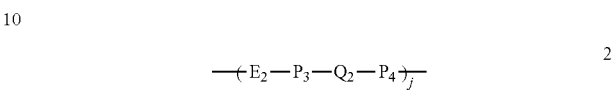

E$_2$ is an aromatic-containing moiety;
P$_3$, P$_4$, are each independently absent, —O—, —S—, —SO—, —SO$_2$—, —CO—, —NH—, —NR$_2$—, or —R$_3$—;
R$_2$ is C$_{1-25}$ alkyl or C$_{1-25}$ aryl;
R$_3$ is C$_{1-25}$ alkylene, C$_{1-25}$ perfluoroalkylene, or C$_{1-25}$ arylene;
j is an integer from 1 to 10,000; and
Q$_2$ is a fluorinated cyclobutyl moiety.

8. The method of claim 7 wherein E$_1$ and E$_2$, independently include one or more of the following moieties:

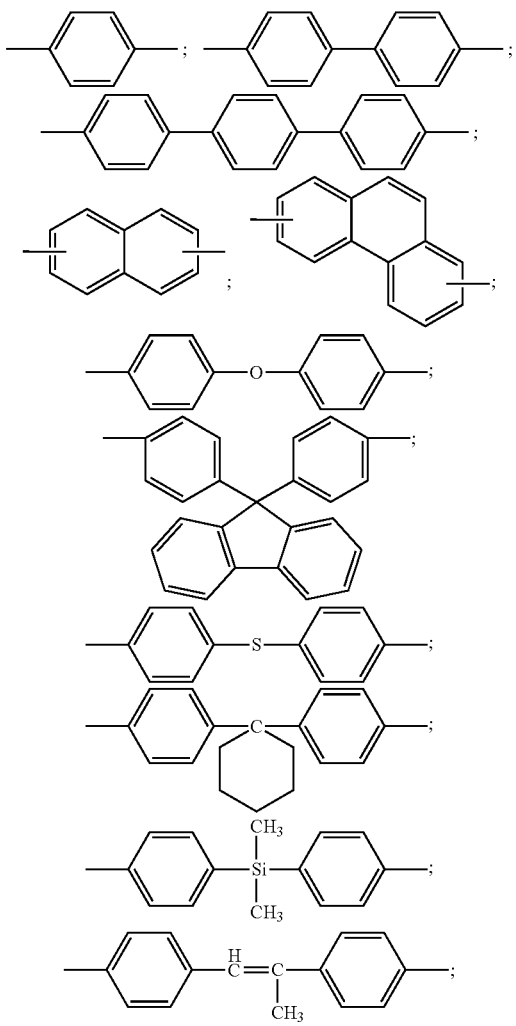

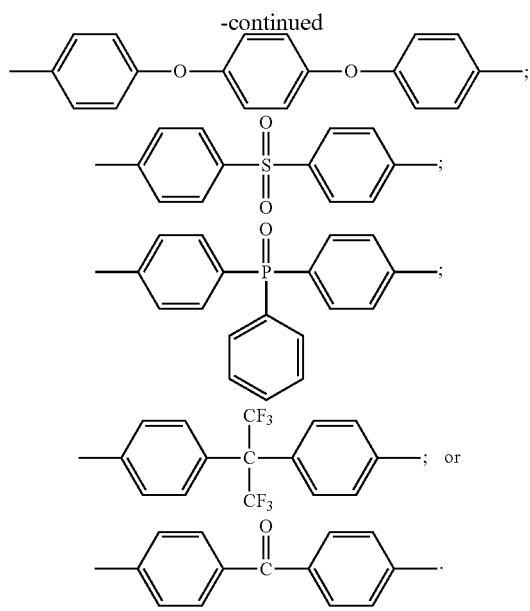

9. The method of claim 1 wherein $Z_2$ is —$SO_3H$.

10. A fuel cell comprising the ionomeric membrane of claim 1.

11. A method of forming an ionomeric membrane comprising polymer units having formulae 1 and 2:

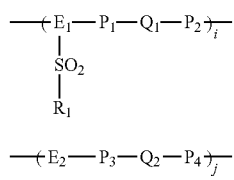

wherein:
$P_1$, $P_2$, $P_3$, $P_4$ are each independently absent, —O—, —S—, —SO—, —SO$_2$—, —CO—, —NH—, —NR$_2$—, or —R$_3$—;
$R_1$ is —OR$_5$, —NR$_5$, —X, —NHR$_5Z_2$, —OR$_5Z_2$, or —NHSO$_2$CF$_3$;
$R_2$ is $C_{1-25}$ alkyl or $C_{1-25}$ aryl;
$R_3$ is $C_{1-25}$ alkylene, $C_{1-25}$ perfluoroalkylene, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group;
$R_5$ is $C_{1-25}$ alkyl or $C_{1-25}$ aryl;
$E_1$ and $E_2$ are each independently an aromatic-containing moiety;
$Z_2$ is —$SO_3H$, —$PO_3H$, —OH, or —$NH_2$;
X is an —OH, a halogen, an ester, or

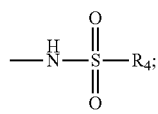

i is an integer from 1 to 10,000;
j is an integer from 1 to 10,000; and
$Q_1$ and $Q_2$ are each independently a fluorinated cyclobutyl moiety, the method comprising:

a) reacting a polymer comprising a polymer unit having formula 3 in chlorosulfonic acid to form a first precipitate, the first precipitate comprising a polymer comprising a polymer unit having formula 4 and dissolves in a polar aprotic solvent to form a first solution:

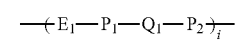

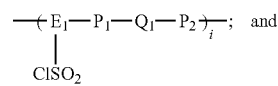

b) forming a polymeric membrane from the first solution, the polymeric membrane including the polymer comprising a polymer unit having formula 4; and c) reacting the polymer comprising a polymer unit having formula 4 with a nucleophilic compound to form a base polymer having polymer unit 1.

12. The method of claim 11 wherein the nucleophilic compound is HOR$_5$.

13. The method of claim 11 wherein the nucleophilic compound is HNR$_5$.

14. The method of claim 11 wherein the nucleophilic compound is HX.

15. The method of claim 11 wherein the nucleophilic compound is HNHR$_5Z_2$.

16. The method of claim 11 wherein the nucleophilic compound is HOR$_5Z_2$.

17. The method of claim 11 wherein $E_1$ and $E_2$, independently include one or more of the following moieties:

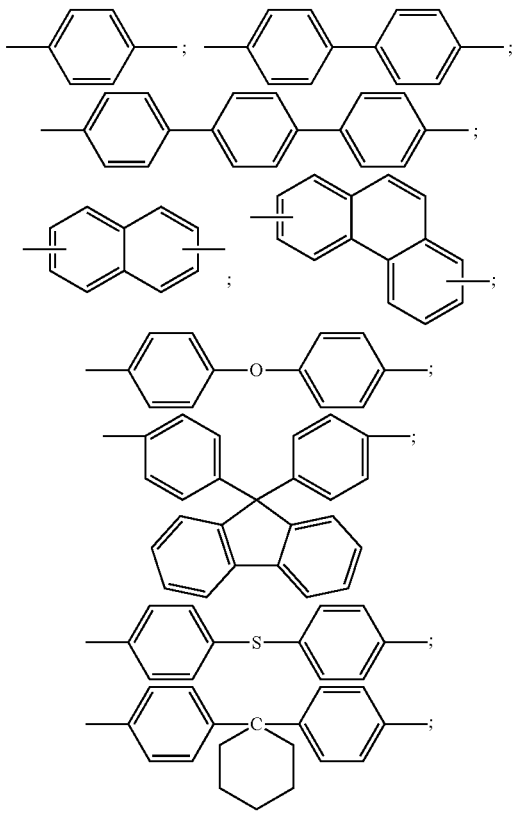

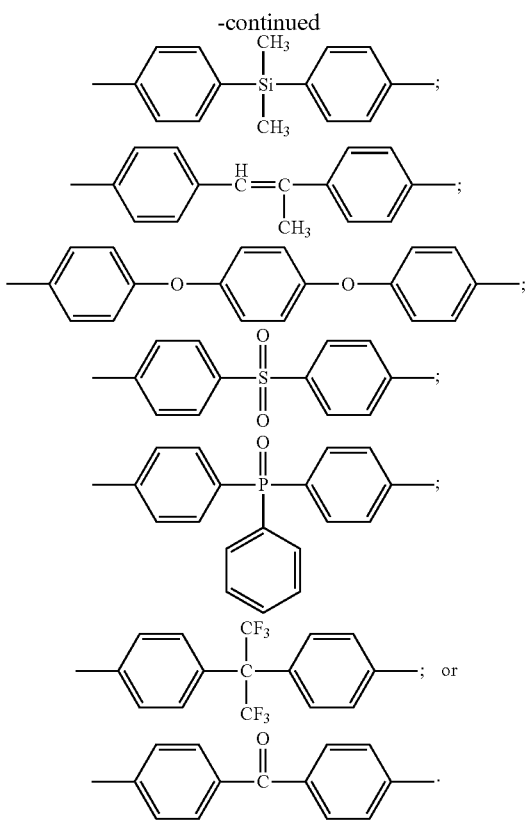

18. The method of claim 11 wherein $Z_2$ is —SO$_3$H.

19. A fuel cell comprising the ionomeric membrane of claim 1.

20. A method of forming an ionomeric membrane comprising polymer unit having formulae 1 and 2:

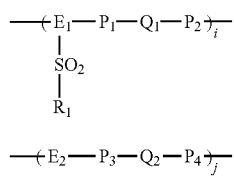

wherein:
$P_1$, $P_2$, $P_3$, $P_4$ are each independently absent, —O—, —S—, —SO—, —SO$_2$—, —CO—, —NH—, —NR$_2$—, or —R$_3$—;
$R_1$ is —OR$_{53}$—NR$_S$, —X, —NHR$_5$Z$_2$, —OR$_5$Z$_2$, or —NHSO$_2$CF$_3$;
$R_2$ is C$_{1-25}$ alkyl or C$_{1-25}$ aryl;
$R_3$ is C$_{1-25}$ alkylene, C$_{1-25}$ perfluoroalkylene, or C$_{1-25}$ arylene;
$R_4$ is trifluoromethyl, C$_{1-25}$ alkyl, C$_{1-25}$ perfluoroalkylene, C$_{1-25}$ aryl, or another E$_1$ group;
$R_5$ is C$_{1-25}$ alkyl or C$_{1-25}$ aryl;
$E_1$ and $E_2$ are each independently an aromatic-containing moiety;
$Z_2$ is —SO$_3$H;
X is an —OH, a halogen, an ester, or

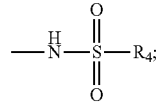

i is an integer from 1 to 10,000;
j is an integer from 1 to 10,000; and
$Q_1$ and $Q_2$ are each independently a fluorinated cyclobutyl moiety, the method comprising:
a) reacting a polymer comprising a polymer unit having formula 3 in chlorosulfonic acid to form a first precipitate, the first precipitate comprising a polymer comprising a polymer unit having formula 4 and dissolves in a polar aprotic solvent to form a first solution:

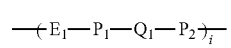

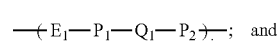

b) forming a polymeric membrane from the first solution, the polymeric membrane including the polymer comprising a polymer unit having formula 4; and
c) reacting the polymer comprising a polymer unit having formula 4 with a nucleophilic compound to form a base polymer having polymer unit 1.

* * * * *